Figure 1:
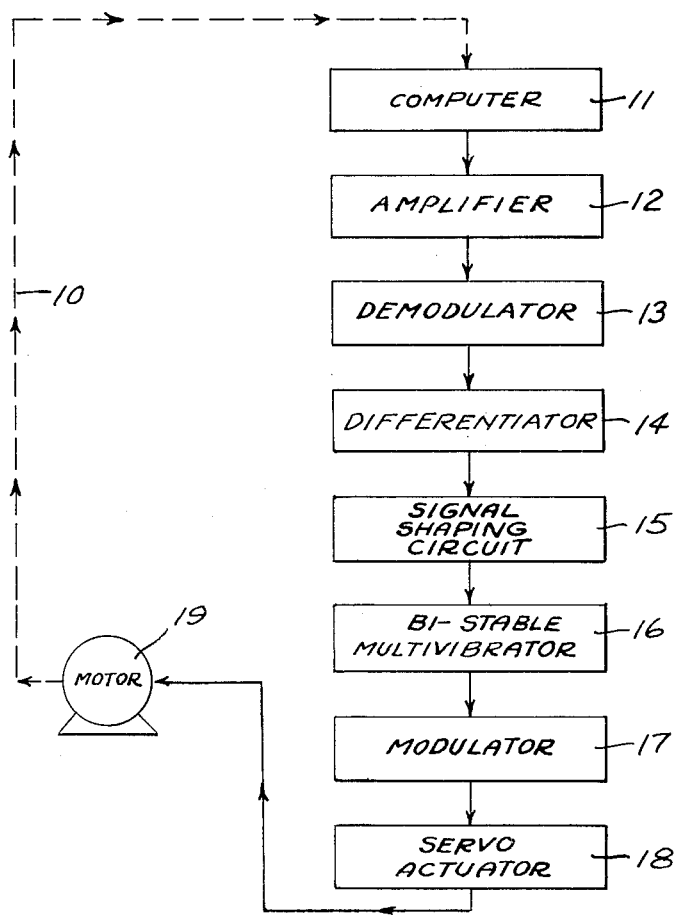

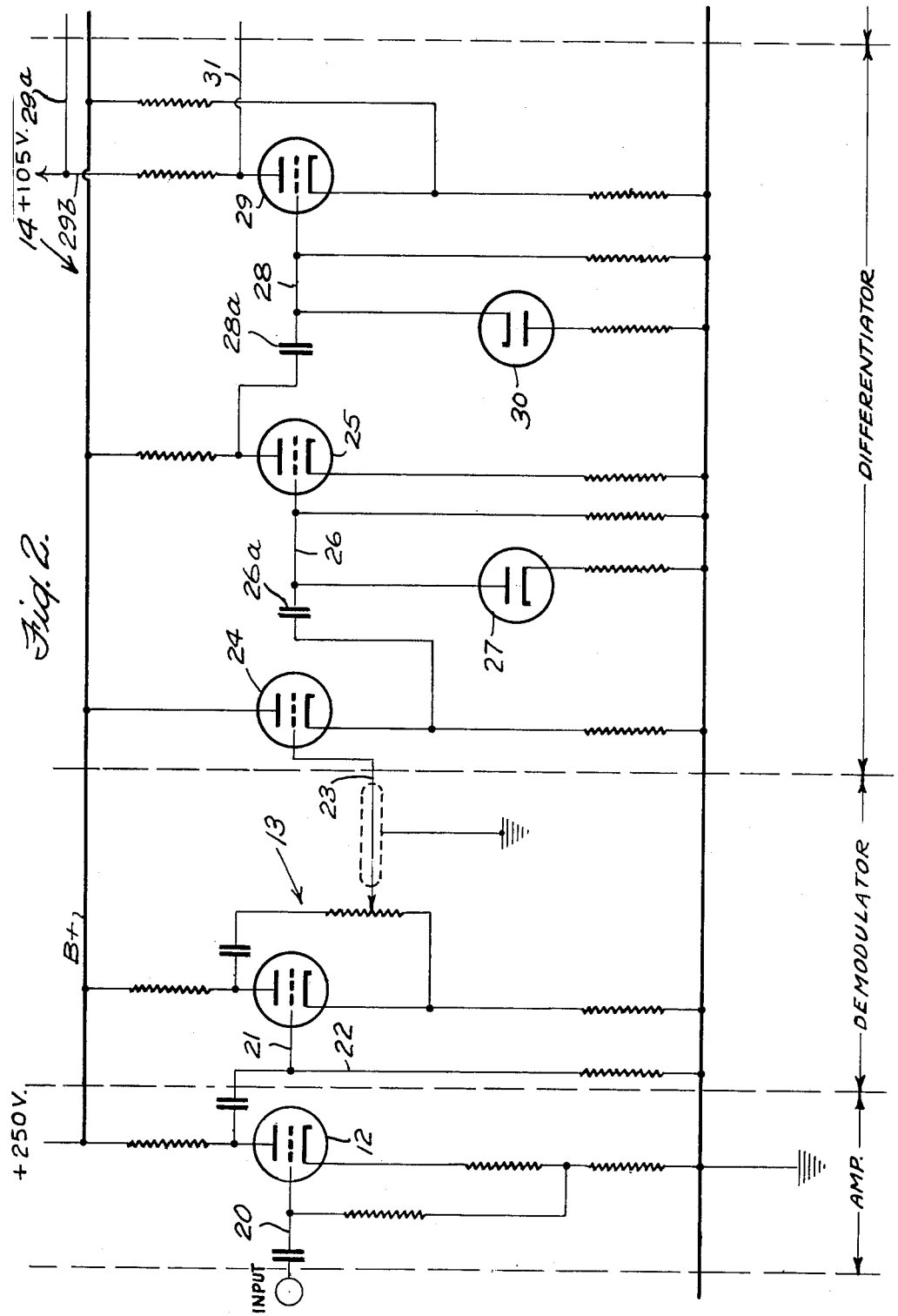

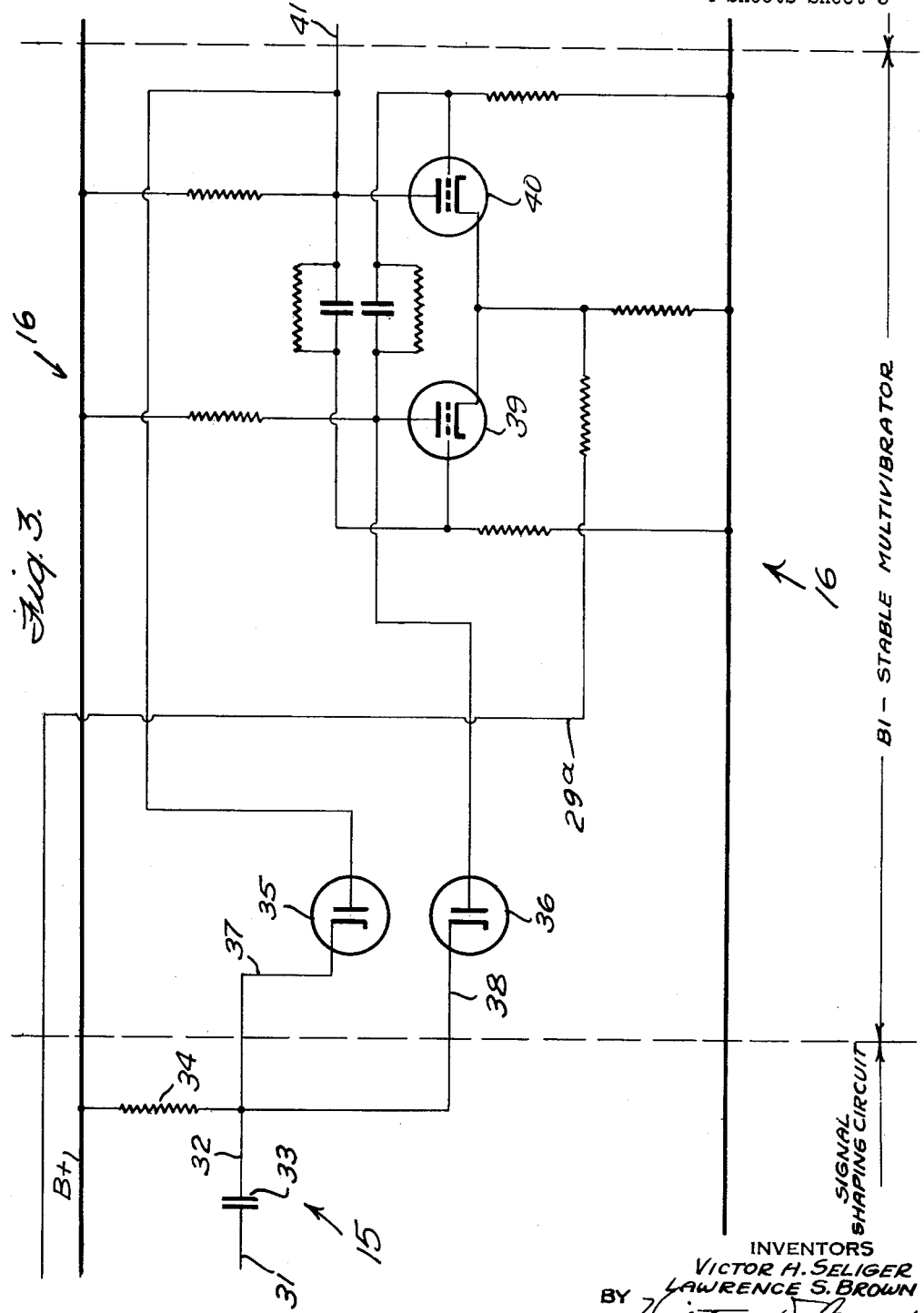

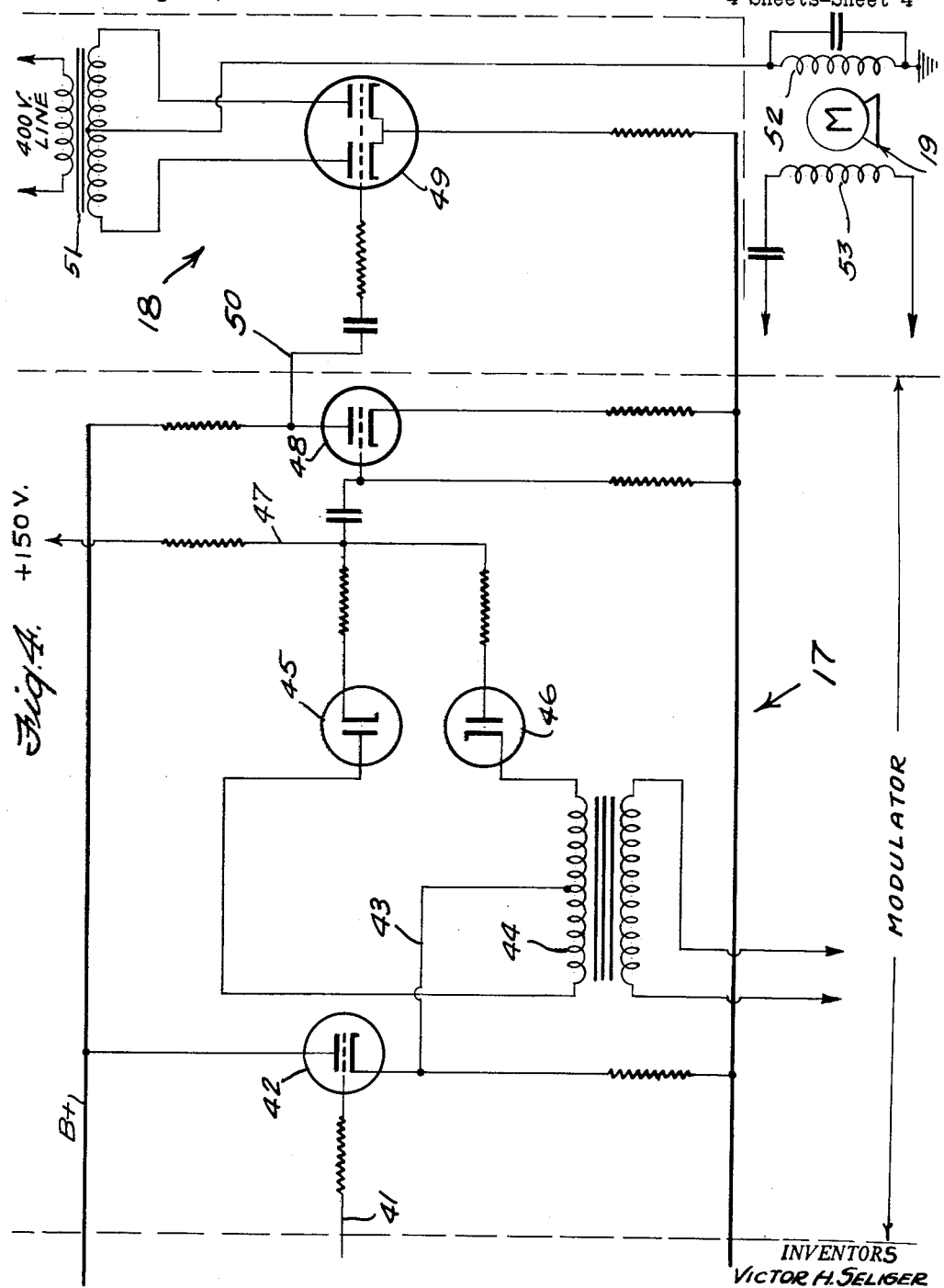

2,995,301
Patented Aug. 8, 1961

2,995,301
FUNCTION MAXIMIZER

Victor H. Seliger, Forest Hills, and Lawrence S. Brown, Massapequa, N.Y., assignors to Sperry Rand Corporation, Ford Instrument Company Division, Long Island City, N.Y., a corporation of Delaware
Filed Aug. 30, 1956, Ser. No. 607,057
5 Claims. (Cl. 235—151)

This invention relates to a device for maximizing an analog function of one or more variables by adjusting one of the independent variables of the function until a peak value is produced.

The device embodying the invention is normally associated with a computer which calculates the value of the function in accordance with quantities set in for the independent variables of that function. This device continuously modifies this set-in variable until the function reaches peak value.

In effect the maximizer finds the value of an independent variable for which a function of that variable is maximum. This maximum value is determined by means of a rate-sensing device which perceives changes in the sign of the time rate of change of the function as the function passes through maximum. A bi-stable device is operated by the rate-sensing device so that when the rate changes direction the device is caused to change state and reverse the direction of control of a servo actuator which adjusts the variable input accordingly. The variable will, therefore, hunt closely around the value for which the function is maximum.

An object of the invention is therefore to provide a computing device for determining the value of one or more independent variables when a function of the variables has reached peak value.

A further object of the invention is to provide means for controlling the variable input to a function generator as the value of the function reaches maximum so that its value at maximum may be known.

Further objects and advantages of the invention may be appreciated on reading the following detailed description which should be read in conjunction with the drawings, in which FIG. 1 is a block diagram of a system employed to adjust a computer input so that the output will be maximum; and FIGS. 2, 3 and 4 are the combined schematic wiring diagrams for the device.

Referring to the block diagram in FIG. 1, a shaft 10, which is settable in accordance with values for the independent variable $x$ of the function $f(x)$, is connected to a computer 11 the output of which is amplified by means of amplifier 12. The computer 11 may take the form of a functional potentiometer which is adapted to yield values of the functions established thereon according to the placement of its stylus or slider by the shaft 10. Potentiometers of this type are described in a publication by Korn and Korn entitled, "Electronic Analog Computers," published by McGraw Hill Book Company, Inc. (1952). The amplifier output is demodulated by means of demodulator 13. A differentiator 14 is connected to the output of the demodulator 13 and serves to sense the sign of the rate of change of the amplified signal. The pulse output of the differentiator 14 is sharpened by signal shaping circuit 15 and the sharpened pulse is employed to trigger a bi-stable multivibrator 16 which provides a 120 volt or 240 volt D.-C. signal depending on its previous state before triggering. A modulator 17 is connected to receive the multivibrator output and provides an A.-C. signal of 0° or 180° phase depending on the output voltage of the multivibrator. A servo actuator 18 is energized by the output of the modulator and transmits to reversible motor 19 a signal of fixed magnitude, the phase of which depends on the phase of the modulator output. Reversible motor 19 is reversed in direction when the rate of change of the generated function changes in sign on passing through its maximum value.

As shown in the circuit diagram of FIG. 2, an amplifier 12 comprises a triode the grid of which receives the electrical output of the computer on line 20 representing the generated function $f(x)$. Unless otherwise described, the plate voltages of the amplifiers are supplied by a 250 volt D.-C. line B+, and the cathode elements self-biased by grounded resistors.

A lead 21 connects the plate circuit 22 of the amplifier 12 to the grid of a tube in a demodulator circuit which is described in patent application Ser. No. 306,803.

Shielded output lead 23 of the demodulator circuit is connected to the grid of cathode follower 24 which provides a low impedance source for the pulse differentiating circuit 14. Accordingly, the cathode element of the cathode follower 24 is connected to the grid of amplifier tube 25 by means of output lead 26 in which there is inserted a condenser 26ª. Rectifier tube 27 is placed across the grid of amplifier tube 25 and permits a large decreasing voltage to be applied to the grid of amplifier tube 25 when the input is decreasing while allowing only a small voltage to be applied when the input is increasing. Hence, when the input signal has passed maximum and is decreasing, amplifier tube 25 is caused to cease conducting.

The polarity of the amplified signal on the grid of the amplifier tube 25 is inverted and appears in the plate lead 28 which is connected through a condenser 28ª to the grid of clipper-amplifier tube 29 having its plate connected to a 105 v. source by lead 29ᵇ. The cathode of rectifier tube 30 is directly connected to the grid of the clipper amplifier tube 29, thus preventing the presence of a signal of appreciable amplitude on the grid of the clipper amplifier tube 29 except when the output of the amplifier tube 25 is increasing. When the output of the amplifier tube 25 is increasing the rectifier tube 30 ceases conducting and a large positive signal appears on the grid of the clipper amplifier tube 29. The amplified signal appears as a negative going wave form in plate lead 31.

A shaping circuit 15 (FIG. 3) comprising a capacitor 33 and resistor 34 is connected to the lead 31 and the line B+, respectively, and serves to sharpen the pulse output of the clipper amplifier tube 29.

The shaping circuit 15 is connected to a pair of diodes 35 and 36 by leads 37 and 38, respectively. The diodes 35 and 36 serve to isolate the plates of multivibrator tubes 39 and 40 and generally to improve the switching action of the bi-stable multivibrator 16.

The plate of each multivibrator tube is connected to the grid of the other tube in the usual manner so that the device may be adapted to provide on output lead 41 120 volts or 240 volts depending on the state of conductivity of the tube 40. The potential on the cathodes of the tubes 39 and 40 is established by their common connection 29ª to the 105 v. source.

The lead 41 is connected to the grid of cathode follower 42 (FIG. 4). Lead 43 connects the cathode of the tube 42 to the center tap of the secondary of transformer 44 which provides the A.-C. carrier for the modulator 17. The phase of the modulator output depends on the direction of unbalance of rectifier tubes 45 and 46, the plate and cathode elements of which are connected, respectively, to the left and right hand ends of the secondary of the transformer 44. The cathode and plates of the tubes 45 and 46 respectively are biased by line 47 connected to a 150 v. source, which is adapted to maintain the tubes 45 and 46 in balanced condition in the absence of a signal on the grid of the cathode follower 42. When a signal appears on the grid, the direction of current flow in the line 47 is determined by the voltage applied to the center tap of the transformer 44. When the multivibrator is stabilized with the tube 40 non-conducting, the plate of tube 45 is made more positive on one half cycle of transformer voltage and the cathode element of the tube 46 is made less negative than it was in balanced condition so that there is a current flow in the line 47 in a direction to increase the voltage on the grid of tube 48. On the other hand, when the multivibrator is stabilized with the tube 40 conducting, the voltage on the line 43 is decreased, unbalancing the tubes 45 and 46 in the opposite direction, and the voltage on the grid of the tube 48 is decreased. Hence, the phase of the positive going pulses on the grid of the tube 48 is shifted 180° with respect to the carrier voltage depending on the state of conductivity of the tube 40 of the multivibrator.

The plate of amplifier 48 is connected to the grid of dual triode 49 in the servo actuator 18 by means of plate lead 50. The plate elements of the dual triode are connected across the secondary of transformer 51 the center tap of which is connected to phase winding 52 of the reversible motor 19. The current in the field winding 53 of the motor 19 is in phase with the voltage applied to the primary of the transformer 44 and the motor is driven in a direction which depends on the particular half cycle of transformer 51 output that a signal appears on the grids of the double triode 49 as determined by the modulator.

In operation the servo motor is driven in a direction to increase the computer output until the output has passed its maximum value and starts to decrease. This decreasing or negative change in the computer output is sensed by the differentiator which passes a signal to the multivibrator. The multivibrator alters the phase of the modulator output and the phase sensitive servo actuator 180° to reverse the servo motor causing the function to pass again through its maximum value and again reverse the motor as it starts to decrease. Thus the motor output representing the independent variable $x$ hunts about the value for which the computer output representing the function $f(x)$ is maximum.

Mechanical means such as a unidirectionally driven ratchet wheel may be substituted for the differentiating circuit to sense negative changes in the time-rate of change of the generated function. The device may be adapted to detect positive rates of change in which event the device may be operated to determine minimum values of the generated function, and means may be provided to connect the servo actuator selectively to more than one variable feed means when the function has more than one independent variable so that the computer inputs may be operated on to ascertain the peak function value for each input consecutively. Other specific changes may be made in the specified arrangement of the device without departing from the principle or scope of the invention. It is therefore understood that the invention is not limited to the arrangement as illustrated and described, except as defined in the following claims.

What is claimed is:

1. A maximizer for a computer capable of calculating values of functions having at least one independent variable comprising a computer, means for feeding said variable to the computer, an amplifier and demodulator connected to the output of the computer, a differentiating circuit connected to the demodulator, a two-state device connected to the output of said differentiating circuit, a modulator connected to the two-state device for converting its rectified output to a full wave output of 0° or 180° phase, a servo actuator connected to said two-state device including a generator, the output phase of which depends on the input phase and servo motor controlled by said servo actuator and connected to said variable feed means, said servo actuator and motor being adapted to reverse said variable feed means when the time-rate of change of the computer output changes in sign.

2. A maximizer as defined in claim 1 in which the two-state device is a bi-stable multivibrator.

3. A maximizer as defined in claim 2 wherein a wave shaping circuit is provided between the differentiating circuit and multivibrator to sharpen the signal impressed on said multivibrator.

4. A maximizer for a computer capable of calculating values of functions having at least one independent variable comprising a computer, means for feeding said variable to the computer, an amplifier and demodulator connected to the output of the computer, a differentating circuit connected to said demodulator, said differentiating circuit comprising the following units in succeeding series connection: a cathode follower, a charger which passes only a decreasing output of said cathode follower, an amplifier arranged to invert the polarity of the signal appearing at its input, a second charger which passes only an increasing amplifier output and a clipper-amplifier; a bi-stable device the state of which is controlled by said differentiating circuit, a modulator connected to said bi-stable device for converting its rectified signal to an alternating current signal of controlled phase and phase sensitive electromechanical translating means connected to said modulator and the variable feed means whereby said modulating means are adapted to reverse said variable feed means when the bi-stable device is changed in state.

5. A maximizer as claimed in claim 4 wherein a wave shaping circuit and trigger tubes are inserted in series between said clipper-amplifier in the differentiating circuit and said bi-stable device whereby the pulse output of the clipper output is sharpened and the switching action of the bi-stable device is improved.

References Cited in the file of this patent

UNITED STATES PATENTS

| | | |
|---|---|---|
| 2,532,158 | Ewing | Nov. 28, 1950 |
| 2,643,820 | Williams et al. | June 30, 1953 |
| 2,666,584 | Kliever | Jan. 19, 1954 |
| 2,753,503 | Wideroe | July 3, 1956 |
| 2,761,284 | Malick | Sept. 4, 1956 |
| 2,777,289 | Boucher | Jan. 15, 1957 |

OTHER REFERENCES

Principles of Optimalizing Control System & An Application to the Internal Combustion Engine (Draper et al.), Sept. 1951, pgs. 8–10, 17–19.